(12) United States Patent
Liang et al.

(10) Patent No.: US 11,468,233 B2
(45) Date of Patent: Oct. 11, 2022

(54) INTENTION IDENTIFICATION METHOD, INTENTION IDENTIFICATION APPARATUS, AND COMPUTER-READABLE RECORDING MEDIUM

(71) Applicants: Liang Liang, Beijing (CN); Lei Ding, Beijing (CN); Bin Dong, Beijing (CN); Shanshan Jiang, Beijing (CN); Yixuan Tong, Beijing (CN)

(72) Inventors: Liang Liang, Beijing (CN); Lei Ding, Beijing (CN); Bin Dong, Beijing (CN); Shanshan Jiang, Beijing (CN); Yixuan Tong, Beijing (CN)

(73) Assignee: Ricoh Company, Ltd., Tokyo (JP)

(*) Notice: Subject to any disclaimer, the term of this patent is extended or adjusted under 35 U.S.C. 154(b) by 321 days.

(21) Appl. No.: 16/750,182

(22) Filed: Jan. 23, 2020

(65) Prior Publication Data
US 2020/0242302 A1 Jul. 30, 2020

(30) Foreign Application Priority Data
Jan. 29, 2019 (CN) .......................... 201910087303.4

(51) Int. Cl.
*G06F 40/216* (2020.01)
*G06F 40/30* (2020.01)
(Continued)

(52) U.S. Cl.
CPC .......... *G06F 40/216* (2020.01); *G06F 16/243* (2019.01); *G06F 40/211* (2020.01); *G06F 40/30* (2020.01); *G06F 40/56* (2020.01)

(58) Field of Classification Search
None
See application file for complete search history.

(56) References Cited

U.S. PATENT DOCUMENTS 8,805,845 B1 * 8/2014 Li ........................... G06F 16/35
707/738
10,282,420 B2   5/2019 Jiang et al.
(Continued)

FOREIGN PATENT DOCUMENTS

CN      104331506 A   *  2/2015
CN      108959252 A   * 12/2018

OTHER PUBLICATIONS

Vincent Ng and Claire Cardie. 2003. Bootstrapping coreference classifiers with multiple machine learning algorithms. In Proceedings of the 2003 conference on Empirical methods in natural language processing (EMNLP '03). Association for Computational Linguistics, USA, 113-120. (Year: 2003).*
(Continued)

*Primary Examiner* — Richemond Dorvil
*Assistant Examiner* — Alexander G Marlow
(74) *Attorney, Agent, or Firm* — IPUSA, PLLC

(57) ABSTRACT

An intention identification method includes generating a heterogeneous text network based on a language material sample; using a graph embedding algorithm to perform learning with respect to the heterogeneous text network and obtain a vector representation of the language material sample and a word, and determining keywords of the language material sample based on a similarity in terms of a vector between the language material sample and the word in the language material sample; training an intention identification model until a predetermined training termination condition is satisfied, by using the keywords of the language material samples, and obtaining the trained intention identification model; and receiving a language material query, and using the trained intention identification model to identify an intention of the language material query.

11 Claims, 7 Drawing Sheets

(51) Int. Cl.
*G06F 16/242* (2019.01)
*G06F 40/56* (2020.01)
*G06F 40/211* (2020.01)

(56) References Cited

U.S. PATENT DOCUMENTS

| | | | | |
|---|---|---|---|---|
| 2012/0254333 | A1* | 10/2012 | Chandramouli | G06N 5/04 709/206 |
| 2014/0279729 | A1* | 9/2014 | Delaney | G06N 20/00 706/12 |
| 2016/0162576 | A1* | 6/2016 | Arino | G06F 40/279 707/739 |
| 2017/0293611 | A1* | 10/2017 | Tu | G06F 40/58 |
| 2018/0032900 | A1* | 2/2018 | Chowdhury | G06N 20/00 |
| 2018/0047036 | A1 | 2/2018 | Zhang et al. | |
| 2018/0341863 | A1 | 11/2018 | Ding et al. | |
| 2019/0103092 | A1* | 4/2019 | Rusak | G06F 40/35 |
| 2019/0251164 | A1 | 8/2019 | Ding et al. | |
| 2020/0005118 | A1* | 1/2020 | Chen | G06N 3/006 |

OTHER PUBLICATIONS

Jinpeng Wang, Gao Cong, Wayne Xin Zhao, and Xiaoming Li. 2015. Mining user intents in twitter: a semi-supervised approach to inferring intent categories for tweets. In Proceedings of the Twenty-Ninth AAAI Conference on Artificial Intelligence (AAAI'15). AAAI Press, 318-324. (Year: 2015).*

Long Chen, Joemon Jose, Haitao Yu, Fajie Yuan, Dell Zhang. "A Semantic Graph based Topic Model for Question Retrieval in Community Question Answering" DOI: http://dx.doi.org/10.1145/2835776.2835809 (Year: 2016).*

Long Chen, Joemon M. Jose, Haitao Yu, Fajie Yuan, A Hybrid Approach for Question Retrieval in Community Question Answerin, The Computer Journal, vol. 60, Issue 7, Jul. 2017, pp. 1019-1031, https://doi.org/10.1093/comjnl/bxw036 (Year: 2017).*

Aditya Grover, Jure Leskovec "node2vec: Scalable Feature Learning for Networks" arXiv:1607.00653 (Year: 2016).*

Hyungsul Kim, Yizhou Sun, Julia Hockenmaier and Jiawei Han "ETM: Entity Topic Models for Mining Documents Associated with Entities" DOI 10.1109/ICDM.2012.107 (Year: 2012).*

* cited by examiner

INTENTION IDENTIFICATION METHOD, INTENTION IDENTIFICATION APPARATUS, AND COMPUTER-READABLE RECORDING MEDIUM

CROSS-REFERENCE TO RELATED APPLICATION

The present application is based on and claims priority under 35 U.S.C. § 119 to Chinese Patent Application No. 201910087303.4, filed on Jan. 29, 2019, the contents of which are incorporated herein by reference in their entirety.

BACKGROUND OF THE INVENTION

1. Field of the Invention

The present invention relates to the field of natural language processing and, more specifically, to an intention identification method, an intention identification apparatus, and a computer-readable recording medium.

2. Description of the Related Art

The scale of the Internet continues to expand, and providing network services to users in an intellectual manner is becoming popular. Under such a trend, by better understanding the user's intentions and truly understanding what the user expects, it is possible to provide a service that is closer to the user, improve the user's experience, and improve the market competitiveness of a product. Therefore, identification of the user's operation intention is particularly important.

Intention identification methods of the related art are mainly divided into three classes: a navigation class, an information class, and a transaction class. The navigation class refers to the user's expectation to find a homepage of a website. The information class refers to the user's expectation to find a web page that meets the user's needs, and such a web page is often a content type web page, for example, a web page in news or an encyclopedia. By reading these pages, the user can obtain satisfactory information. The transaction class refers to the user's expectation that a web page will be able to complete a transaction. Examples are bank transfers, product purchases, airline ticket confirmation, and the like.

SUMMARY OF THE INVENTION

According to one aspect of the present invention, there is provided an intention identification method including generating a heterogeneous text network based on a language material sample, wherein the language material sample includes a plurality of labeled language materials to which an intention has already been labeled and a plurality of unlabeled language materials to which an intention has not been labeled, and wherein the heterogeneous text network includes a first co-occurrence relationship between the language material sample and a word and a second co-occurrence relationship between words; using a graph embedding algorithm to perform learning with respect to the heterogeneous text network and obtain a vector representation of the language material sample and a word, and determining keywords of the language material sample based on a similarity in terms of a vector between the language material sample and the word in the language material sample; training an intention identification model until a predetermined training termination condition is satisfied, by using the keywords of a plurality of the language material samples, and then obtaining the intention identification model for which the training has been completed, wherein the intention identification model is an intention identification classifier including a plurality of different language levels; and receiving a language material query, and using the intention identification model for which the training has been completed to identify an intention of the language material query.

DETAILED DESCRIPTION OF THE PREFERRED EMBODIMENTS

As the information gathering technology evolves, simply categorizing intentions does not satisfy demands for identifying the user's intention when providing services to the user. The information entered by the user is often short but the content is complex, and the identification result obtained by the intention identification method of the related art is often not what the user really desires to express, and there is a need to identify complex information of the user by an intention identification method that is more intellectually improved.

The currently mainstream intention identification methods of the related art generally have low model identification accuracy. There is currently no effective solution to the problem of low identification accuracy when identifying the user's intentions in the related art.

A problem to be addressed by an embodiment of the present invention is to provide an intention identification method, an intention identification apparatus, and a computer-readable recording medium for improving the identification accuracy of an intention identification model.

In order to further clarify the technical problems and technical solutions to be addressed by embodiments of the present invention and advantages of embodiments of the present invention, the drawings and the specific embodiments will be described in detail below. In the following description, specific arrangements and specific details of components are provided only for the purpose of assisting the understanding of embodiments of the present invention. Accordingly, it will be obvious to those skilled in the art that various modifications and improvements may be made to the embodiments described herein without departing from the scope and spirit of the invention. In addition, for the sake of clarity and conciseness, descriptions of known functions and structures are omitted.

By "one embodiment" or "embodiment" referred to herein, it is meant that certain features, structures, or characteristics associated with the embodiment are included in at least one embodiment of the present invention. Accordingly, the terms "in one embodiment" or "in an embodiment" which appear throughout the present specification do not necessarily refer to the same embodiment. Note that these particular features, structures, or characteristics may optionally be combined in one or more embodiments in a suitable manner.

In various embodiments of the present invention, each process number below is not meant to indicate whether the process is to precede or follow another process in an order of execution. The order in which each process is performed depends on the corresponding function and intrinsic logic and is not limited in any way to the process of implementing embodiments of the present invention.

Figure 1:
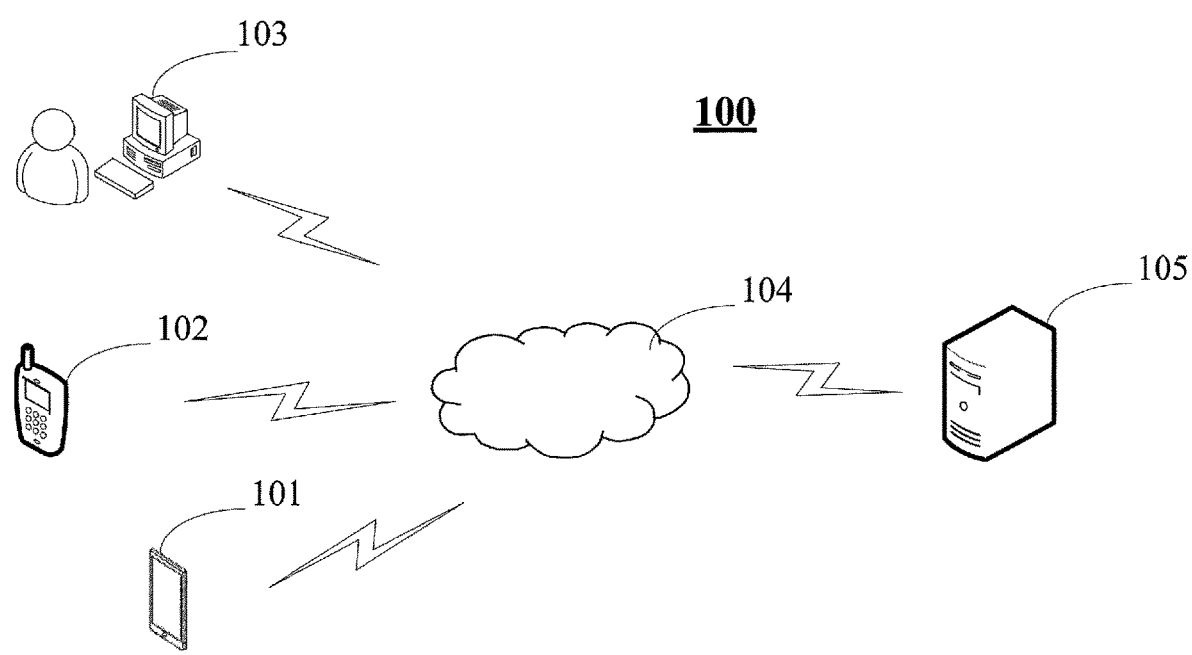
FIG. 1 is a diagram illustrating the usage scene of an intention identification method according to an embodiment of the present invention.

An embodiment of the present invention provides an intention identification method and an intention identification apparatus that can reduce the dependency of intention identification models on label data and improve the accuracy of identification of intention identification models. This method can be used in a variety of contexts relating to intention identification in a natural language, for example, in interactive robots and search engines. FIG. 1 illustrates an exemplary system architecture 100 that can use the intention identification method according to an embodiment of the present invention. As illustrated in FIG. 1, the system architecture 100 may include terminal devices 101, 102, and 103, a network 104, and a server 105. The network 104 provides a communication link medium between the terminal devices 101, 102, and 103 and the server 105. The network 104 may include various types of connections, such as, for example, a wired line, a wireless communication link, or an optical fiber cable.

The user uses the terminal devices 101, 102, and 103 to transmit information, such as a language material query, through the interaction of the network 104 and the server 105. Various communication user applications, such as text editing applications, information retrieval applications, and information transmission applications, can be installed in the terminal devices 101, 102, and 103. The terminal devices 101, 102, and 103 may be various electronic devices that are equipped with a display and that are capable of transmitting information and files, and examples are, but not limited to, smartphones, tablets, laptop computers, and desktop computers. The server 105 can execute an intention identification process. Specifically, the server 105 receives a language material query from the terminal device, and enters the language material query into a pre-trained intention identification model, thereby predicting the intention of the language material query and then returning the prediction result of the intention to the terminal.

It is to be explained that the intention identification method according to an embodiment of the present application is executable by the server 105, and accordingly, the intention identification apparatus can be installed in the server 105. As a matter of course, the intention identification method according to an embodiment of the present invention may be executed by a terminal device, and accordingly, the intention identification apparatus may be installed in the terminal.

It is to be understood that the number of terminal devices, networks, and servers in FIG. 1 are merely schematic. Based on the needs in implementation, any number of terminal devices, networks, and servers may be provided.

Figure 2:
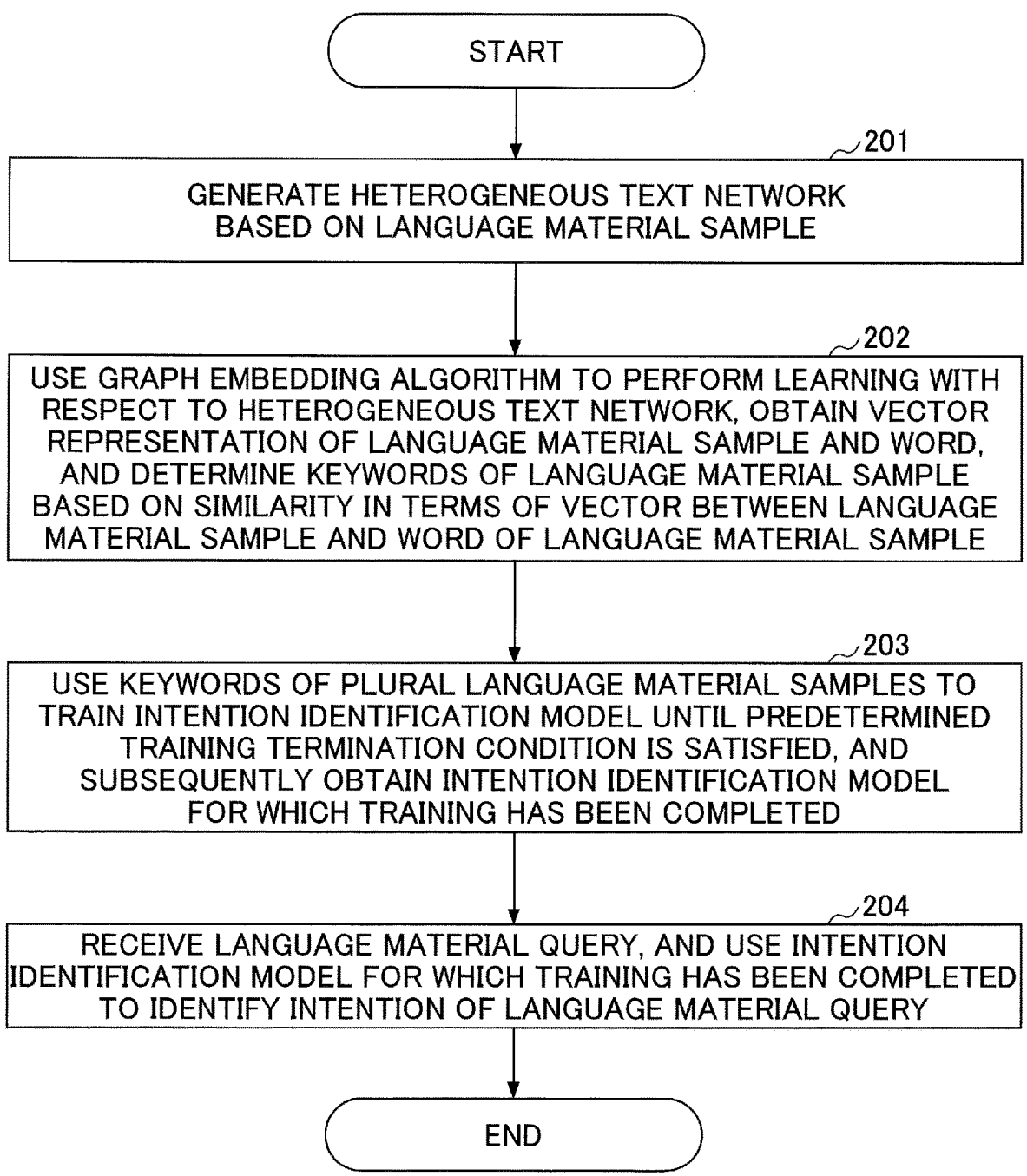
FIG. 2 is a flowchart of an intention identification method according to an embodiment of the present invention.

FIG. 2 is a flowchart of an intention identification method according to an embodiment of the present invention. The intention identification method can reduce the dependence of the intention identification model on the label data and improve the identification accuracy of the intention identification model. As illustrated in FIG. 2, the intention identification method may include the following steps.

In step 201, a heterogeneous text network is generated based on a language material sample.

Here, the language material sample includes a plurality of labeled language materials to which intentions have already been labeled, and a plurality of unlabeled language materials to which intentions have not yet been labeled. The heterogeneous text network may also include a first co-occurrence relationship between the language material sample and a word and a second co-occurrence relationship between a word and a word.

Specifically, in the above-described step 201, according to an embodiment of the present invention, it is possible to perform a character string preprocess on the language material sample to obtain a language material sample after preprocessing. The preprocessing includes data cleaning, stop word, an error correction process, and a stemming process. Thereafter, it is possible to extract a word in the language material text and establish a co-occurrence relationship between the language material text and the extracted word, and to extract two words present in the same language material text and establish a second co-occurrence relationship between the two words. Accordingly, it is possible to generate a heterogeneous text network including the first and second co-occurrence relationships.

In step 201, according to an embodiment of the present invention, the heterogeneous text network is generated, and the heterogeneous text network does not only include the co-occurrence relationship between a word and a word but also includes a co-occurrence relationship between a word and a language material text. A co-occurrence relationship between a word and a word refers to two words appearing in the same language material text, and the first co-occurrence relationship between the language material sample and a word refers to the word appearing in the language material text.

Figure 3:
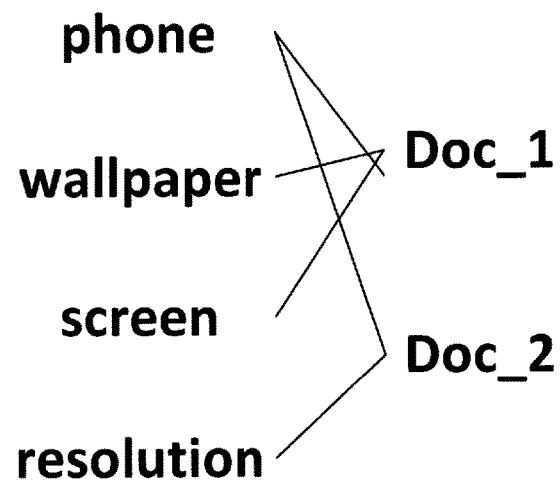
FIG. 3 is a diagram illustrating an example of a co-occurrence network including a first co-occurrence relationship according to an embodiment of the present invention.

FIG. 3 illustrates an example of a co-occurrence network including a first co-occurrence relationship between a language material sample and a word. Here, the words include phone, wallpaper, and screen, and the language material text includes Doc_1 and Doc_2. As illustrated in FIG. 3, each word and each language material text is a node in the network, and if there are several words in several language material samples, a word and a language material sample are connected by a single connection line to indicate that there is a co-occurrence relationship between the word and the language material text at both ends of the connection line. That is, it is indicated that a word at one end of the connection line is present in the language material text at the other end of the connection line.

Figure 4:
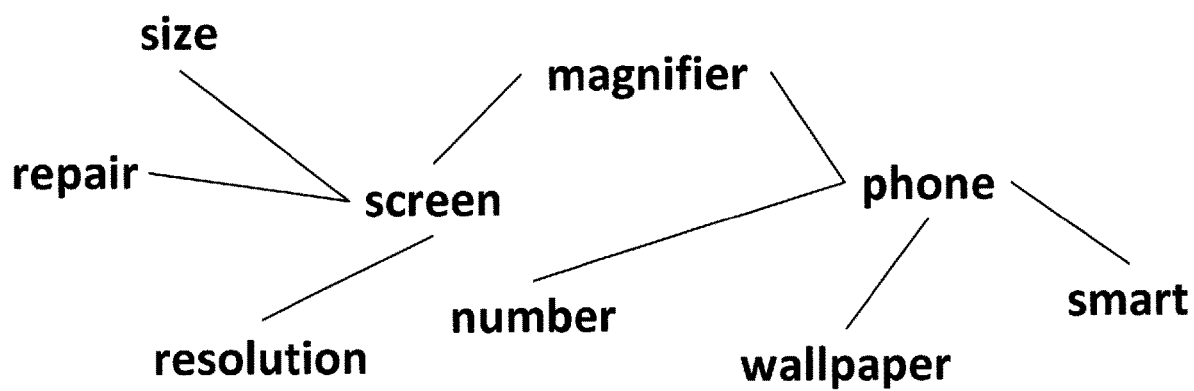
FIG. 4 is a diagram illustrating an example of a co-occurrence network including a second co-occurrence relationship according to an embodiment of the present invention.

FIG. 4 is a diagram illustrating an example of a co-occurrence network including a second co-occurrence relationship between a word and a word. Here, a plurality of words, such as size, repair, and screen, is included. As illustrated in FIG. 4, each of the words is a node in the network, and when there are two words in the same language material sample, the two words are connected by a single connection line to indicate that there is a co-occurrence relationship between the words at both ends of the connection line. That is, it is indicated that a word at one end of the connection line and a word at the other end of the connection line are present in the same language material text.

In step 202, a graph embedding algorithm is used to perform learning with respect to the heterogeneous text network to obtain a vector representation of the language material sample and a word, and determine keywords of the language material sample based on the similarity in terms of the vector between the language material sample and a word.

In an embodiment of the present invention, various graph embedding algorithms of the related art may be used to perform learning with respect to the heterogeneous text network obtained in step 201, and obtain the vector representation of a language material sample and a word. After obtaining the vector representations, the similarity in terms of the vector between the language material sample and each word in the language material sample is calculated, based on the vector representations. Thereafter, a predetermined number of words having the highest similarity in terms of vector are selected to be the keywords of the language material sample. Specifically, the predetermined number can be set in advance based on the needs, and can be set to one or more. For example, when the sample language material includes a relatively large number of words, the predetermined number can be set to be a relatively large number, and conversely, when the sample language material includes a relatively small number of words, the predetermined number can be set to be a relatively small number. Further, for example, it is possible to set all of the predetermined numbers to a fixed value, for example, one or two.

In step 203, the keywords of the plurality of language material samples are used to train the intention identification model until a predetermined training termination condition is satisfied, and thereafter, an intention identification model for which training has been completed is obtained. Note that the above-described intention identification model is an intention identification classifier that includes a plurality of different language levels.

In an embodiment of the present invention, a plurality of intention identification classifiers having different language levels are introduced to improve the robustness of the intention identification apparatus. Specifically, language levels include at least two levels among a character level, a word level, and a phrase level. The setting of the language level can be implemented by referring to the related art and is not specifically limited in an embodiment of the present invention. One possible setting is as follows.

For a language such as English, the words are formed by alphabetical letters, and the words can include word stems. Thus, a character-level language level is an alphabetical letter or a word stem formed by an alphabetical letter, a word-level language level is a word, and a phrase-level language level is a phrase formed by at least two words.

For a language such as Chinese, the character-level language level is a single kanji character (Chinese character), the word-level language level is a word typically formed of at least two kanji characters, and the phrase-level language level is a phrase that includes at least two words, or a phrase that includes at least one kanji character and one word.

It is to be explained that, when training the intention identification model, with respect to the intention identification classifier of the respective language levels in the intention identification model, there is a need to perform a correspondence process to match the keywords in the language material sample to the language levels of the intention identification classifier. Specifically, in step 203, the keywords of the language levels can be converted into an input sequence of the language levels based on the language levels of the intention identification classifier. Further, the input sequence can be input to the intention identification classifier and training can be performed with respect to the intention identification classifier.

For example, when the language level is a word level, the input sequence is a sequence of keywords in the labeled language material, and when the language level is a character level, the input sequence is a sequence of characters obtained by dividing keywords in the labeled language material, and when the language level is a phrase level, the input sequence is an order of phrases in the labeled language material, and the phrase is formed of keywords for which the positional relationship in the labeled language material satisfies a predetermined condition. For example, the predetermined condition may be keywords whose positions are adjacent to each other in the labeled language material, that is, the predetermined condition may be a phrase formed of keywords whose positions are adjacent to each other in the labeled language material. For example, the predetermined condition may be such that the distance between keywords in the labeled language material does not exceed a predetermined number set in advance. Note that the distance between the two keywords is represented by the number of related keywords that exist between the two keywords. For example, when the positions of two keywords are adjacent to each other, then the distance between the two keywords is 0, and when only one keyword exists between the two keywords, the distance between the two keywords is 1.

In step 203, the keywords of the labeled language material can be used to train the intention identification classifier. Thereafter, a determination is made as to whether a predetermined training termination condition is satisfied, and when the training termination condition is satisfied, the training process is terminated, otherwise, a plurality of intention identification classifiers obtained by the training are used to predict the intention of the unlabeled language material and the prediction reliability (reliability of prediction). At this time, the unlabeled language material with a relatively high prediction reliability (when a predetermined degree of reliability is reached) is labeled in view of the prediction result of intention, and the newly labeled unlabeled language material is added to the labeled language material to update the labeled language material. Thereafter, the intention identification classifier is trained using the keywords of the labeled language material, and is repeatedly trained until the training termination condition is satisfied.

After the training of the intention identification model has satisfied the predetermined training termination condition, the training is terminated, and at this time, an intention identification model for which training has been completed can be obtained. The training termination condition may be whether the number of times of performing training has reached a predetermined number of times, the training time has reached a predetermined time, the convergence of the intention identification model has reached a predetermined requirement, and the like.

In step 204, a language material query is received and the intention identification model for which training has been completed is used to identify the intention of the language material query.

After obtaining the intention identification model at step 203, according to an embodiment of the present invention, the intention identification model is used to perform intention identification with respect to the received language material query, predict the intention of the language material query, and output a prediction result.

As can be seen from the above steps, the intention identification method according to an embodiment of the present invention can generate a heterogeneous text network based on the co-occurrence relationship between words and the co-occurrence relationship between words and language material samples, and extract keywords based on a graph embedding algorithm, thereby obtaining a better representation of the relevant co-occurrence relationships, which can be used as a basis for more efficient and accurate keyword extraction, thereby training and obtaining a semi-supervisory intention identification model. This intention identification model has a relatively low dependency on label data and a relatively high identification accuracy.

Note that the intention identification model of an embodiment of the present invention includes a plurality of intention identification classifiers, and when training by using a language material or performing intention identification of the intention of the language material, all of the intention identification classifiers can output one intention prediction result and a prediction reliability thereof. According to an embodiment of the present invention, when the prediction results of multiple (more than half) intention identification classifiers are the same, the intention prediction results of these intention identification classifiers can be set as the prediction result of the language material, and the prediction reliability of the prediction result can be determined based on the prediction reliability of the plurality of intention identification classifiers. For example, an average value of the prediction reliabilities of the plurality of intention identification classifiers is calculated and the calculated result is set as the prediction reliability of the prediction result. Further, for example, the maximum or minimum value of the prediction reliabilities of the plurality of intention identification classifiers may be the prediction reliability of the prediction result.

The data distribution of the language material sample is responsive to the characteristics of the diversity of the language material samples of different categories. In the selection of samples in a semi-supervisory intention identification model of the related art, unlabeled language materials with high prediction reliabilities tend to be selected. In this process, the data distribution of label data tends to be overlooked, and it is difficult to reflect the diversity of the data distribution after sample selection, and this is not useful for model generalization. An embodiment of the present invention introduces the characteristics of diversity samples, and aims to select unlabeled samples under current label sample data distribution conditions, thereby expanding the database of labeled language materials, to achieve intention identification purposes based on small quantities of labeled language materials.

Specifically, for the purpose of further robustness and effectiveness of the intention identification model obtained by training, in an embodiment of the present invention, when performing the update of the language material sample in step 203, the probability distribution of the labeled language material is made to be more balanced based on the principle of diversity samples, and the intention identification model trained in this manner is more robust and effective.

Figure 5:
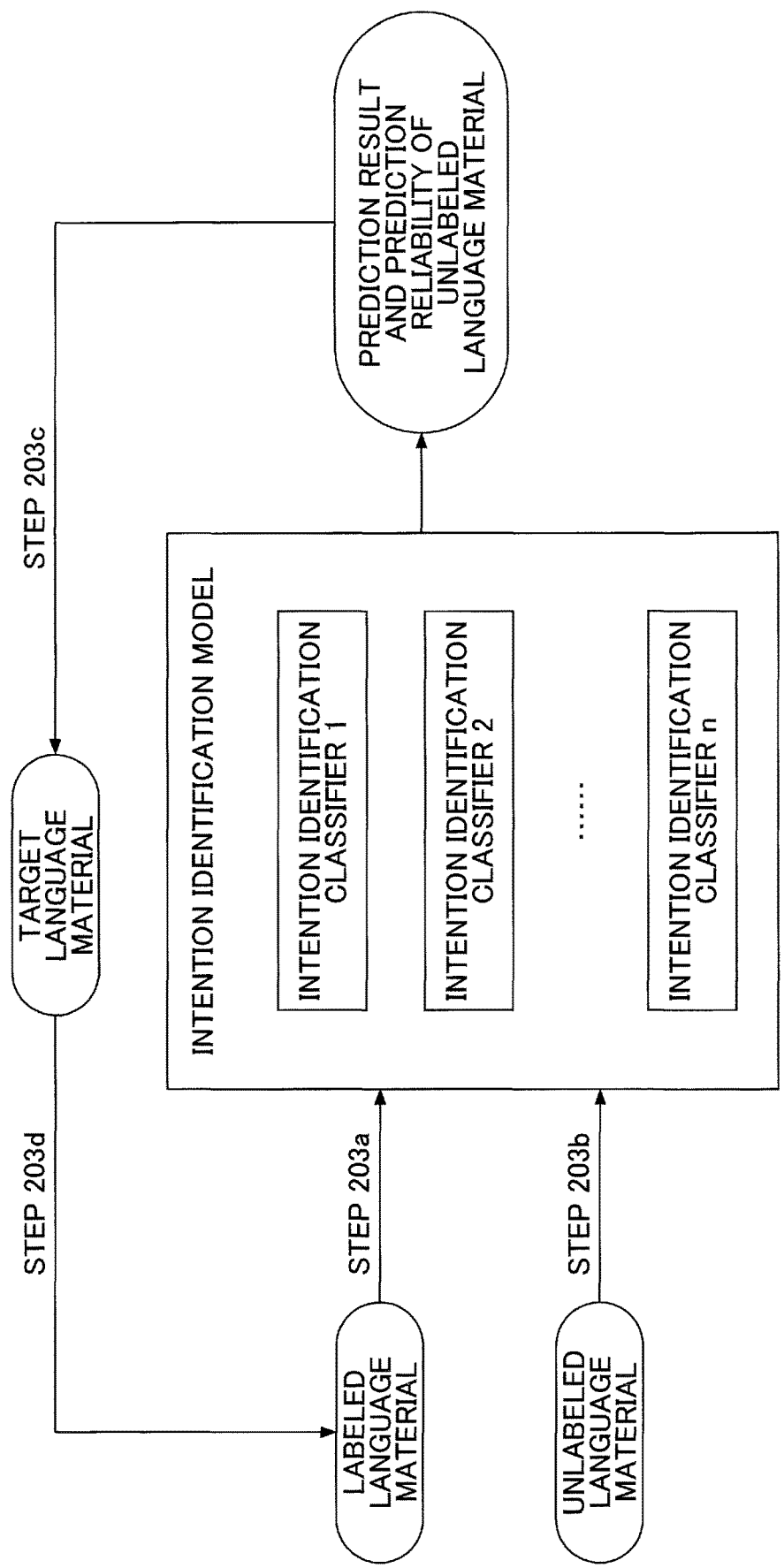
FIG. 5 is a diagram illustrating an example of a training process by an intention identification apparatus according to an embodiment of the present invention.

The training process of step 203 is described in association with the intention identification model of FIG. 5. The intention identification model of FIG. 5 includes intention identification classifiers 1-n; a total of n classifiers. Each classifier may specifically be a classifier of the Long Short-Term Memory (LSTM) model or a classifier of another model; an embodiment of the present invention is not specifically limited thereto. Specifically, step 203 may include the following steps.

In step 203a, the keywords of the labeled language material are used to train the intention identification classifiers, and thereafter, it is determined whether the training termination condition is satisfied, and when the training termination condition is satisfied, the training process is terminated, and when the training termination condition is not satisfied, the process proceeds to step 203b.

Here, a single training process is executed based on the current labeled language material. Specifically, in addition to inputting the labeled language material into each intention identification classifier, the training of the intention identification classifier is performed using the label data of the labeled language material, and after the current training is terminated, it is determined whether the predetermined training termination condition is satisfied, and when satisfied, the intention identification model obtained by training can be output, and when not satisfied, the process proceeds to the subsequent step 203b and the sample data of the labeled language material can be updated.

In step 203b, a plurality of trained intention identification classifiers are used to predict the intention of the unlabeled language material and the prediction reliability.

In step 203b, the intention identification classifier trained in step 203a is used to predict the intention of each unlabeled language material, to obtain the prediction result of the intention and the prediction reliability. Here, an unlabeled language material for which the prediction result satisfies a predetermined condition, can be added to a candidate set. Specifically, the predetermined condition may be that when the prediction results with respect to the unlabeled language material are all the same for greater than or equal to half of the intention identification classifiers among the plurality of intention identification classifiers, the prediction result of greater than or equal to half of the intention identification classifiers may be set as the intention prediction result of the unlabeled language material; or when there is a prediction result for which the reliability is higher than a predetermined reliability threshold among the prediction results of the plurality of intention identification classifiers, the prediction result of the intention identification classifier having the highest reliability may be set as the intention prediction result of the unlabeled language material. The prediction reliability of the intention prediction result for the unlabeled language material can be determined by the above method, and will not be redundantly stated here.

In step 203c, the probability distribution of the unlabeled language material vector is acquired, a target language material, for which the prediction reliability is greater than a predetermined first threshold value and the probability corresponding to a feature vector is less than a predetermined second threshold value, is selected from the unlabeled language material, and the target language material is labeled based on the predicted intention and the prediction reliability.

Here, the selected target language material has a prediction reliability greater than the predetermined first threshold value and a corresponding probability in the feature vector probability distribution of the target language material that is less than the second threshold value. That is, in an embodiment of the present invention, when refilling the language material data in the labeled language material, the unlabeled language material having a low probability distribution of the feature vector in the current labeled language material is preferentially selected, and, therefore, the distribution of the labeled language material for training the model is more rational, and the model obtained by such training is even more robust and effective. Further, in step 203c, the target language material satisfying the above-described condition can be selected from the above candidate set, thereby reducing the computation amount when selecting a language material.

In step 203d, the target language material is deleted from the unlabeled language material, and the target language material is added to the labeled language material, thereby implementing the refilling and updating of the labeled language material, and thereafter, the process returns to step 203a to continue the next training process.

By the above steps, an embodiment of the present invention can provide a more balanced feature vector distribution of the labeled language material, thereby enhancing the robustness and effectiveness of the trained intention identification model.

Figure 6:
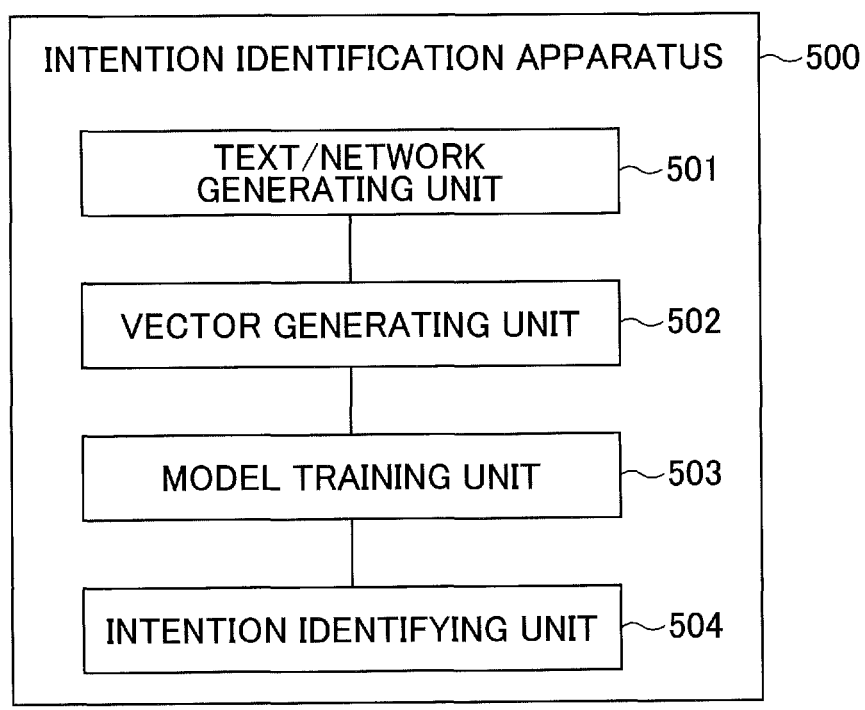
FIG. 6 is a structural diagram of the intention identification apparatus according to an embodiment of the present invention.

Based on the above method, an embodiment of the present invention also provides an apparatus for carrying out the above methods. Referring to FIG. 6, an intention identification apparatus 500 according to an embodiment of the present invention includes: a text/network generating unit 501 configured to generate a heterogeneous text network based on a language material sample, wherein the language material sample includes a plurality of labeled language materials to which intentions have already been labeled and a plurality of unlabeled language materials to which intentions have not yet been labeled, and wherein the heterogeneous text network includes a first co-occurrence relationship between a language material sample and a word and a second co-occurrence relationship between a word and a word; a vector generating unit 502 configured to use a graph embedding algorithm to learn the heterogeneous text network to obtain a vector representation of the language material sample and a word, and to determine keywords of the language material sample based on the similarity in terms of the vector between the language material sample and the word of the language material sample;
a model training unit 503 configured to use the keywords of the plurality of language material samples to train an intention identification model until a predetermined training termination condition is satisfied, and thereafter obtain an intention identification model for which training has been completed, the intention identification model being an intention identification classifier including a plurality of different language levels; and an intention identifying unit 504 configured to receive a language material query and use the intention identification model for which training has been completed to identify the intention of the language material query.

Figure 7:
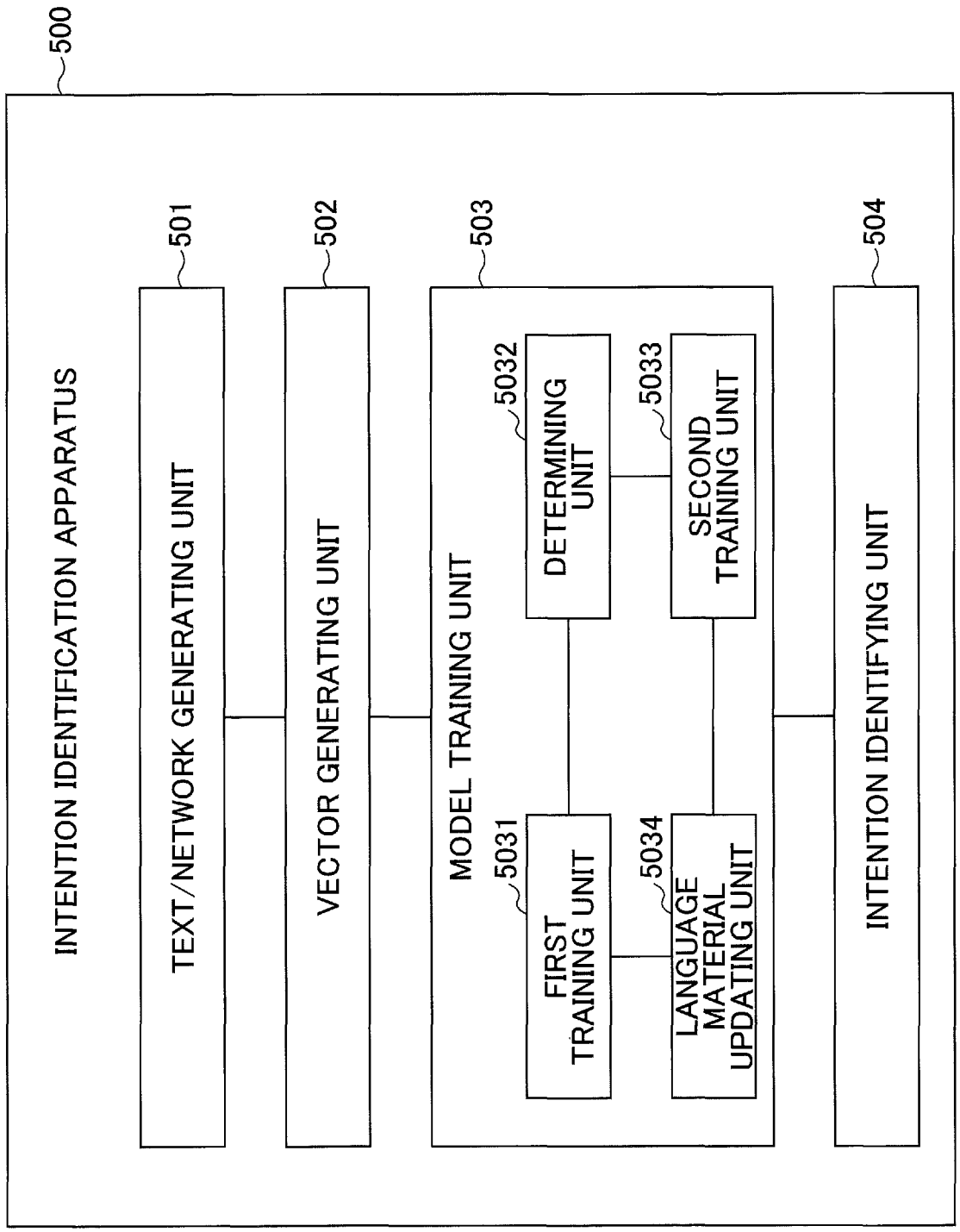
FIG. 7 is another structural diagram of the intention identification apparatus according to an embodiment of the present invention.

Preferably, as illustrated in FIG. 7, the model training unit 503 includes:
a first training unit 5031 configured to use keywords of the labeled language material to train the intention identification classifier;
a determining unit 5032 configured to terminate the training process when the above-described training termination condition is satisfied, and otherwise trigger a second training unit;

a second training unit 5033 configured to use a plurality of intention identification classifiers obtained by the training, and predict the intention and prediction reliability of an unlabeled language material, upon being triggered by the determining unit 5032; and
a language material updating unit 5034 configured to acquire a probability distribution of the unlabeled language material vector, select, from the unlabeled language materials, a target language material having a prediction reliability that is greater than a predetermined first threshold and a probability corresponding to a feature vector that is less than a predetermined second threshold, labeling the target language material based on predicted intention and prediction reliability, delete the target language material from the unlabeled language materials and add the target language material into the labeled language materials, and trigger the first training unit to continue training the intention identification classifier.

Preferably, specifically, the first training unit 5031 is used to convert keywords of the labeled language material into an input sequence of language levels based on the language levels of the intention identification classifier, to input the input sequence into the intention identification classifier, and to provide training to the intention identification classifier.

When the language level is a word level, the input sequence is a sequence of keywords in the labeled language material, when the language level is a character level, the input sequence is a sequence of characters obtained by dividing the keywords in the labeled language material, and when the language level is a phrase level, the input sequence is the order of phrases in the labeled language material, and the phrase is formed of keywords whose positional relationships in the labeled language material satisfy a predetermined condition.

Preferably, specifically, the text/network generating unit 501 is used to perform a character string preprocess on a language material sample to obtain a language material sample after the preprocess, wherein the preprocess includes data cleaning, stop word, an error correction process, and a stemming process, to extract a word in the language material text to establish a co-occurrence relationship between the language material text and the extracted word, to extract two words present in the same language material text to establish a second co-occurrence relationship between the words, and to generate a heterogeneous text network including the first co-occurrence relationship and the second co-occurrence relationship.

Preferably, specifically, the vector generation unit 502 is used to calculate the similarity in terms of the vector between the language material sample and each word in the language material sample, and to select a predetermined number of words having the highest similarity in terms of the vector as keywords of the language material sample.

Preferably, the language level includes at least two levels among a character level, a word level, and a phrase level.

By the above units, the intention identification apparatus 500 according to an embodiment of the present invention can reduce the dependence of the intention identifying model on label data and improve the identification accuracy of the intention identifying model.

Figure 8:
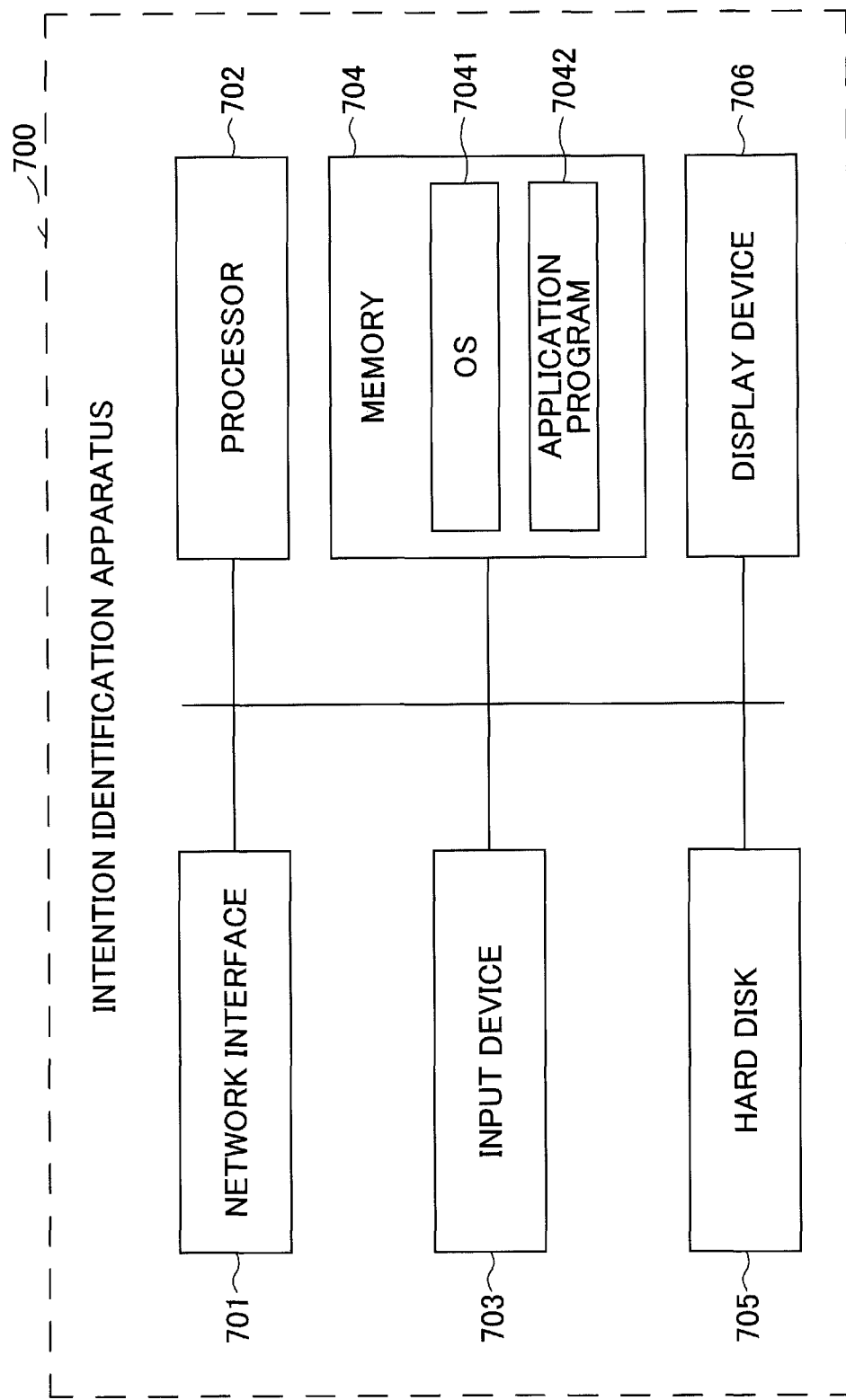
FIG. 8 is yet another structural diagram of the intention identification apparatus according to an embodiment of the present invention.

FIG. 8 is a hardware structure block diagram of the intention identification apparatus according to an embodiment of the present invention. As illustrated in FIG. 8, an intention identification apparatus 700 includes:
a processor 702; and
a memory 704 in which computer program commands are stored.

When the computer program command is executed by the processor, the processor 702 executes:

a step of generating a heterogeneous text network based on a language material sample, wherein the language material sample includes a plurality of labeled language materials to which an intention is already labeled and a plurality of unlabeled language materials to which an intention is not yet labeled, and wherein the heterogeneous text network includes a first co-occurrence relationship between the language material sample and a word and a second co-occurrence relationship between a word and a word;

a step of using a graph embedding algorithm to learn the heterogeneous text network to obtain a vector representation of the language material sample and the word and to determine keywords of the language material sample based on the similarity in terms of the vector between the language material sample and the word of the language material sample;

a step of using the keywords of the plurality of language material samples to train the intention identification model until a predetermined training termination condition is satisfied, and then obtaining the intention identification model for which training has been completed, wherein the intention identification model is an intention identification classifier including a plurality of different language levels; and a step of receiving a language material query and using the intention identification model for which training has been completed to identify the intention of the language material query.

Further, as illustrated in FIG. 8, the intention identification apparatus 700 may include a network interface 701, an input device 703, a hard disk 705, and a display device 706.

The above interfaces and devices are coupled to each other by a bus architecture. The bus architecture may include any number of interconnecting buses and bridges. Specifically, one or more central processing units (CPUs) such as the processor 702 and various circuits of one or more memories such as the memory 704, are coupled to each other. The bus architecture may be coupled together with peripheral devices, voltage regulators, and a variety of other circuits such as power management circuits. It is understood that the bus architecture is for implementing coupling and communication between these elements. The bus architecture may include a data bus, and also a power bus, a control bus, and a status signal bus, all of which are known in the art and are not described in detail herein.

The network interface 701 may be coupled to a network (e.g., the Internet, a local area network, etc.), receive information from the network, and store the received information in the hard disk 705. For example, collected language material samples are stored in the hard disk 705.

The input device 703 can receive various commands entered by an operator and transmit the commands to the processor 702 to be executed. The input device 703 may include a keyboard or clicking device (e.g., a mouse, a trackball, a touchpad, a touch screen, etc.).

The display device 706 may display the results obtained by executing commands by the processor 702. For example, the intention prediction result and the reliability thereof of the language material are displayed.

The memory 704 is used to store data such as programs and data that are essential for the operating system to run, intermediate results during a computing process by the processor 702, and the like.

It will be appreciated that the memory 704 according to an embodiment of the present invention may be a volatile memory or a non-volatile memory, and may include both a volatile memory and a non-volatile memory. Note that the non-volatile memory may be a read-only memory (ROM), a programmable read-only memory (PROM), an erasable programmable read-only memory (EPROM), an electrically erasable programmable read-only memory (EEPROM), or a flash memory. The volatile memory may be random access memory (RAM) and is used as an external cache. The memory 704 of the apparatus and of the methods described herein includes, but is not limited to, the above and any other suitable type of memory.

In some embodiments, the memory 704 stores elements such as an executable module or data structure, sub-sets or extended sets thereof, an operating system 7041, and an application program 7042.

Note that the operating system 7041 may also include various system programs, such as, for example, a framework layer, a core layer, a drive layer, or the like, to implement a variety of basic tasks and hardware based tasks. The application program 7042 includes various application programs, such as a browser, to implement various application tasks. A program for implementing the method according to an embodiment of the present invention may be included in the application program 7042.

The method according to the above-described embodiment of the present invention can be applied to or implemented by the processor 702. The processor 702 may be an integrated circuit chip with signal processing capability. In the implementation process, each of the steps of the above method can be completed by an integrated logic circuit of hardware within the processor 702 or commands in the form of software. The processor 702 may be a general purpose processor, a digital signal processor (DSP), an application specific integrated circuit (ASIC), a field programmable gate array (FPGA) or other programmable logic devices, an individual gate or a transistor logic device, or an individual hardware unit, and may implement or execute each method, step, and logic block diagram described in embodiments of the present invention. A general purpose processor may be a microprocessor or any regular processor. What can be accomplished directly in combination with the steps of the method described in the embodiments of the present invention, can be completed by execution by a hardware decoder processor or can be completed by execution by a combination of hardware and software modules within the decoder processor. The software module may be located in a storage medium that is mature in the art, such as a random memory, a flash memory, a read-only memory, a programmable read-only memory, an electrically erasable programmable memory, a register, and the like. The recording medium is in the memory 704, and the processor 702 reads the information in the memory 704 and combines the information with the hardware in the processor 702 to complete steps of the above method.

It is understood that the embodiments described herein can be implemented by hardware, software, firmware, middleware, microcode, or combinations thereof. For hardware implementation, the process unit may be implemented by at least one of an application-specific integrated circuit (ASIC), a digital signal processor (DSP), a digital signal processing device (DSPD), a programmable logic device (PLD), a field programmable gate array (FPGA), a general-purpose processor, a controller, a microcontroller, a microprocessor, other electronic modules for implementing the foregoing functions described herein, or combinations thereof.

For software implementation, the techniques described herein can be implemented by modules (e.g., processes, functions, etc.) that execute the functions described herein. A software code is stored in a memory and can be executed by the processor. The memory can be implemented in or outside the processor.

Specifically, when the above-described computer program is executed by the processor 702, it is possible to implement:

a step of using keywords of the labeled language material to train an intention identification classifier;

a step of terminating the training process when the training termination condition is satisfied, otherwise using a plurality of intention identification classifiers obtained by training to predict the intention and prediction reliability of the unlabeled language material;

a step of acquiring a probability distribution of the unlabeled language material vector, selecting, from the unlabeled language materials, a target language material having a prediction reliability that is greater than a predetermined first threshold value and a probability corresponding to a feature vector that is less than a predetermined second threshold value, and labeling the target language material based on the predicted intention and prediction reliability; and a step of deleting the target language material from the unlabeled language materials, adding the target language material into the labeled language material, returning to using a feature vector of the labeled language material, and training the intention identification classifier.

Specifically, when the computer program is executed by the processor 702, it is possible to implement a step of converting keywords of the labeled language material into an input sequence of the language level based on the language level of the intention identification classifier, and inputting the input sequence into the intention identification classifier and training the intention identification classifier.

Note that when the language level is a word level, the input sequence is a sequence of the keywords in the labeled language material, when the language level is a character level, the input sequence is a sequence of characters obtained by dividing keywords in the labeled language material, and when the language level is a phrase level, the input sequence is an order of phrases in the labeled language material, and the phrase is formed by keywords having positional relationships in the labeled language material satisfying a predetermined condition.

Specifically, when the computer program is executed by the processor 702, it is possible to implement:

a step of performing a character string preprocess on the language material sample, obtaining a language material sample after the preprocess, wherein the preprocess includes data cleaning, stop word, an error correction process, and a stemming process; a step of extracting a word in the language material text to establish a first co-occurrence relationship between the language material text and the extracted word, and extracting two words present in the same language material text to establish a second co-occurrence relationship between the words; and a step of generating a heterogeneous text network including the first co-occurrence relationship and the second co-occurrence relationship.

The similarity in terms of the vector between the language material sample and each word of the language material sample is calculated, and a predetermined number of words having the highest similarity in terms of the vector are selected to be keywords of the language material sample.

Preferably, the language level includes at least two levels among the character level, the word level, and the phrase level.

Those skilled in the art will appreciate that the various examples of units and algorithm steps described in the embodiments described herein may be combined, and implemented by electronic hardware or by a combination of computer software and electronic hardware. Whether these functions are executed by hardware or software depends on the specific application and design constraints of the technical solution. Those skilled in the art will be able to implement the foregoing functions using different methods for each particular application, but such an implementation is not to be considered to be beyond the scope of the present invention.

For the sake of convenience and conciseness, those skilled in the art can clearly understand that reference can be made to a corresponding process according to an embodiment of the method described above, with respect to specific work processes of the above system, apparatus, and units, and therefore redundant descriptions will not be mentioned here.

It is to be understood that the methods and apparatus disclosed in the embodiments according to the present invention can be implemented in other forms. For example, the apparatus described above is only schematic. For example, the division of the units is merely a logical function division, and other division methods may be employed in the actual implementation. For example, a plurality of units or modules may be combined, aggregated into another system, or some functions may be omitted or may not be executed. Further, the interconnections, direct connections, or communicable connections indicated or disclosed above may be a connection via an interface, and the indirect connection or communicable connection between devices or units may be electrical or mechanical or in other forms of connections.

The units described as the separated members may or may not be physically separated. The members indicated as units may or may not be physical units. That is, the units may be located in the same location or distributed over multiple network units. Depending on the actual needs, some or all of the units may be selected to implement the object of an embodiment of the present invention.

Further, each functional unit in each embodiment of the present invention may be assembled into a single process unit, each unit may physically exist alone, or two or more units may be assembled into a single unit.

The functions may be implemented in the form of software function units, and may be stored in a computer-readable storage medium when sold or used as a stand-alone product. Based on this understanding, the essence of the technical solution of the present invention, or the portion which contributes with respect to the related art, or a portion of the technical solution, can be implemented in the form of a software product. The computer software product may be stored in a recording medium, and includes some commands for a computer device (which may be a personal computer, a server, or network equipment, etc.) to execute all or part of the steps of the method described in each embodiment of the present application. The recording medium includes a variety of media capable of storing program codes, such as a Universal Serial Bus (USB) memory, a removable disk, a read-only memory (ROM), a random access memory (RAM), a magnetic disk, or an optical disk.

The foregoing description is merely a specific embodiment of the invention, and the scope of protection of the present invention is not limited thereto. Within the disclosed technical scope of the present invention, changes or substitutions conceivable by those skilled in the art are to be included within the scope of the present invention. Therefore, the scope of protection of the present invention is to be in accordance with the scope of protection of the rights claimed.

According to one embodiment of the present invention, an intention identification method, an intention identification apparatus, and a computer-readable recording medium are provided, which can obtain better representations of relevant co-occurrence relationships by extracting keywords based on a graph embedding algorithm, based on which more efficient and accurate keyword extraction can be performed, and accordingly, it is possible to train and obtain a semi-supervisory intention identification model. The intention identification model has a relatively low dependency on label data and a relatively high identification accuracy. Also, when updating the language material sample according to embodiments of the present invention, a more balanced probability distribution of the label language material is provided based on the principle of diversity sampling, and the intention identification model so trained is more robust and effective.

The intention identification method, the intention identification apparatus, and the computer-readable recording medium are not limited to the specific embodiments described in the detailed description, and variations and modifications may be made without departing from the spirit and scope of the present invention.

What is claimed is:

1. An intention identification method comprising:
   generating a heterogeneous text network based on
      a plurality of language material samples that include
         a plurality of labeled language materials to which an intention has been labeled, and
         a plurality of unlabeled language materials to which an intention has not been labeled, wherein
            the heterogeneous text network includes a first co-occurrence relationship indicating that a word occurs in a language material sample from among the plurality of language material samples, and a second co-occurrence relationship indicating that two or more words appear in the language material sample;
   using a graph embedding algorithm to
      perform learning with respect to the heterogeneous text network,
      obtain a vector representation of the language material sample and the word, and
   determining keywords of the language material sample based on a similarity in terms of a vector between the language material sample and the word in the language material sample;
   training an intention identification model until a predetermined training termination condition is satisfied, the intention identification model being one or more intention identification classifiers that include a plurality of different language levels, wherein
      the training of the intention identification model includes matching the keywords of each language material sample of the plurality of the language material samples to a language level of the one or more intention identification classifiers;
   receiving a language material query; and
   identifying an intention of the received language material query using the trained intention identification model.

2. The intention identification method according to claim 1, wherein
   the training of the intention identification model includes:
      training an intention identification classifier of the one or more intention identification classifiers by using the keywords of each language material sample of the plurality of labeled language materials;
      terminating the training upon
         detecting that the predetermined training termination condition is satisfied, or
         predicting an intention and a prediction reliability of the plurality of unlabeled language materials by using a plurality of the trained intention identification classifiers upon detecting that the predetermined training termination condition is not satisfied;
      acquiring a probability distribution of vectors of the plurality of unlabeled language materials, selecting, from the plurality of unlabeled language materials, a target language material for which the prediction reliability is greater than a predetermined first threshold and for which a probability corresponding to a feature vector is less than a predetermined second threshold, and labeling an intention to the target language material based on the intention and the prediction reliability that have been predicted; and
      deleting the target language material from the plurality of unlabeled language materials, adding the target language material to the plurality of labeled language materials, returning to using, a feature vector of the plurality of labeled language materials, and training the intention identification classifier.

3. The intention identification method according to claim 2, wherein
   the training of the intention identification classifier includes:
   converting the keywords of the plurality of labeled language materials into an input sequence of the language levels of the intention identification classifier based on the language levels of the intention identification classifier,
   inputting the input sequence to the intention identification classifier, and
   training the intention identification classifier, wherein
      when the language levels are word levels, the input sequence is a sequence of the keywords in the plurality of labeled language materials, when the language levels are character levels, the input sequence is a sequence of characters obtained by dividing the keywords in the plurality of labeled language materials, and when the language levels are phrase levels, the input sequence is an order of phrases in the plurality of labeled language materials, and the phrases are formed by the keywords whose positional relationships in the plurality of labeled language materials satisfy a predetermined condition.

4. The intention identification method according to claim 1, wherein
   the generating of the heterogeneous text network based on the language material sample includes:
   performing a character string preprocess with respect to the language material sample and obtaining the language material sample that has undergone the character string preprocess, the character string preprocess including data cleaning, stop word, an error correction process, and a stemming process;

extracting a word in a language material text, which is obtained by processing the language material sample, and establishing the first co-occurrence relationship, and extracting two words present in the same language material text and establishing the second co-occurrence relationship; and generating the heterogeneous text network including the first co-occurrence relationship and the second co-occurrence relationship.

5. The intention identification method according to claim 1, wherein the determining of the keywords of the language material sample based on the similarity in terms of the vector between the language material sample and the word in the language material sample includes:

calculating, the similarity in terms of the vector between the language material sample and the word in the language material sample; and selecting a predetermined number of words for which the similarity in terms of the vector is maximum, and determining the selected words as the keywords of the language material sample.

6. The intention identification method according to claim 1, wherein the language levels include at least two levels among a character level, a word level, and a phrase level.

7. A non-transitory computer-readable recording medium storing a computer program, wherein the intention identification method according to claim 1 is executed by having a processor execute the computer program.

8. An intention identification apparatus comprising:
a processor; and
a memory storing program instructions that cause the processor to implement:
a text network generator configured to-generate a heterogeneous text network based on
a plurality of language material samples that include
a plurality of labeled language materials to which an intention has already been labeled, and
a plurality of unlabeled language materials to which an intention has not been labeled, wherein
the heterogeneous text network includes a first co-occurrence relationship indicating that a word occurs in a language material sample from among the plurality of language material samples, and a second co-occurrence relationship indicating that two or more words appear in the language material sample;
a vector generator configured to-use a graph embedding algorithm to
perform learning with respect to the heterogeneous text network,
obtain a vector representation of the language material sample and the word, and
determine keywords of the language material sample based on a similarity in terms of a vector between the language material sample and the word in the language material sample;
a model trainer configured to train an intention identification model until a predetermined training termination condition is satisfied the intention identification model being one or more intention identification classifiers that include a plurality of different language levels, wherein
the training of the intention identification model includes matching the keywords of each language material sample of the plurality of the language material samples, to a language level of the one or more intention identification classifiers; and
receive a language material query; and
identify an intention of the received language material query using the trained intention identification model.

9. The intention identification apparatus according to claim 8, wherein the program instructions further cause the processor to implement:
a first trainer configured to train an intention identification classifier of the one or more intention identification classifiers by using the keywords of each language material sample of the plurality of labeled language materials;
a determiner configured to terminate the training upon detecting that the predetermined training termination condition is satisfied;
a second trainer configured to predict an intention and a prediction reliability of the plurality of unlabeled language materials by using a plurality of the trained intention identification classifiers
the second trainer being triggered by the determiner upon detecting that the predetermined training termination condition is not satisfied; and
a language material updater configured to
acquire a probability distribution of vectors of the plurality of unlabeled language materials,
select, from the plurality of unlabeled language materials, a target language material for which the prediction reliability is greater than a predetermined first threshold and for which a probability corresponding to a feature vector is less than a predetermined second threshold,
label an intention to the target language material based on the intention and the prediction reliability that have been predicted,
delete the target language material from the plurality of unlabeled language materials,
add the target language material to the plurality of labeled language materials, and
trigger the first trainer to continue training the intention identification classifier.

10. The intention identification apparatus according to claim 9, wherein
the first trainer implemented by the processor is further configured to:
convert the keywords of the plurality of labeled language materials into an input sequence of the language levels of the intention identification classifier based on the language levels of the intention identification classifier,
input the input sequence to the intention identification classifier, and
train the intention identification classifier, wherein
when the language levels are word levels, the input sequence is a sequence of the keywords in the plurality of labeled language materials, when the language levels are character levels, the input sequence is a sequence of characters obtained by dividing the keywords in the plurality of labeled language materials, and when the language levels are phrase levels, the input sequence is an order of phrases in the plurality of labeled language materials, and the phrases are formed by the keywords whose positional relationships in the plurality of labeled language materials satisfy a predetermined condition.

11. The intention identification apparatus according to claim 8, wherein
the program instructions further cause the processor to:
perform a character string preprocess with respect to the language material sample and obtain the language material sample that has undergone the character string preprocess, the character string preprocess including data cleaning, stop word, an error correction process, and a stemming process; and
extract a word in a language material text, which is obtained by processing the language material sample, and establish the first co-occurrence relationship, and extract two words present in the same language material text and establish the second co-occurrence relationship; and
generate the heterogeneous text network including the first co-occurrence relationship and the second co-occurrence relationship.

\* \* \* \* \*